(12) United States Patent
Williams

(10) Patent No.: US 12,515,485 B2
(45) Date of Patent: Jan. 6, 2026

(54) CABLE TOW HOOK ASSEMBLIES AND VEHICLES INCLUDING SAME

(71) Applicant: Toyota Motor Engineering & Manufacturing North America, Inc., Plano, TX (US)

(72) Inventor: Paxton S. Williams, Milan, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 532 days.

(21) Appl. No.: 17/963,401

(22) Filed: Oct. 11, 2022

(65) Prior Publication Data

US 2024/0116317 A1    Apr. 11, 2024

(51) Int. Cl.
*B60D 1/56* (2006.01)
*B60D 1/04* (2006.01)

(52) U.S. Cl.
CPC .................... *B60D 1/56* (2013.01); *B60D 1/04* (2013.01)

(58) Field of Classification Search
CPC .................. B60D 1/56; B60D 1/04
See application file for complete search history.

(56) References Cited

U.S. PATENT DOCUMENTS

| | | |
|---|---|---|
| 7,290,783 B2 | 11/2007 | Dombos |
| 7,758,060 B2 * | 7/2010 | Lopez ...................... B60D 1/52 |
| | | 280/505 |
| 8,251,414 B2 * | 8/2012 | Brown ..................... B60R 19/48 |
| | | 293/102 |
| 8,371,602 B1 | 2/2013 | Peschansky et al. |
| 9,139,058 B2 | 9/2015 | Livingstone et al. |
| 10,464,382 B2 * | 11/2019 | Ghannam .............. B60D 1/167 |
| 10,933,706 B2 | 3/2021 | Shenaz et al. |
| 2011/0187081 A1 * | 8/2011 | Ando ....................... B60D 1/52 |
| | | 280/477 |
| 2018/0229562 A1 * | 8/2018 | Farooq .................... B60R 21/34 |
| 2020/0070601 A1 * | 3/2020 | Greggs .................. B60D 1/565 |
| 2024/0131885 A1 * | 4/2024 | DeWitt .................. B60D 1/243 |
| 2024/0227473 A1 * | 7/2024 | Harpster ................ B60D 1/243 |
| 2024/0375465 A1 * | 11/2024 | Babymony .............. B60D 1/04 |

FOREIGN PATENT DOCUMENTS

| | | | | |
|---|---|---|---|---|
| CN | 110254147 A | | 9/2019 | |
| CN | 209365789 U | | 9/2019 | |
| DE | 10110332 A1 | * | 9/2002 | ............ B60D 1/243 |
| DE | 102004056249 A1 | * | 5/2006 | ............ B60D 1/243 |
| DE | 102018105151 A1 | * | 9/2018 | ............ B60D 1/04 |
| DE | 102019119432 A1 | * | 1/2020 | ............ B60D 1/54 |
| DE | 102021214714 A1 | * | 10/2022 | ............ B60D 1/54 |
| FR | 2909948 A1 | * | 6/2008 | ............ B60D 1/488 |
| JP | 2803326 B2 | * | 9/1990 | |
| JP | 4539320 B2 | * | 9/2010 | |
| JP | 2020011672 A | | 1/2020 | |

* cited by examiner

*Primary Examiner* — Faye M Fleming
(74) *Attorney, Agent, or Firm* — Dinsmore & Shohl LLP

(57) ABSTRACT

A vehicle including a vehicle frame, a front bumper, and a tow hook assembly. The vehicle frame has an open interior. The front bumper includes a front surface, a rear surface opposite the front surface, and a channel extending between the front surface and the rear surface. The tow hook assembly includes an attachment cord coupled to the vehicle frame and extends through the channel of the front bumper.

20 Claims, 3 Drawing Sheets

CABLE TOW HOOK ASSEMBLIES AND VEHICLES INCLUDING SAME

TECHNICAL FIELD

The present specification generally relates to tow hooks for vehicles and, more specifically, to tow hook assemblies including flexible attachment cord.

BACKGROUND

To tow a vehicle in the event of an accident, malfunction, loss of gas, being stuck in mud or snow, or the like, tow hooks are provided at specific locations of a frame of the vehicle to tow the vehicle without damage. Tow hooks are typically mounted on a front rail of the vehicle and may extend through apertures formed in a front bumper of the vehicle to project outwardly therefrom. Alternatively, tow hooks may project from beneath the front bumper or many other locations around the vehicle, for example, the rear of the vehicle.

Tow hooks are typically formed from a rigid material to withstand large forces when being towed and to remain secured to the vehicle itself. However, the rigid tow hook is connected to the vehicle in a way that may cause damage to one or more parts of the vehicle.

Accordingly, a need exists for an improved vehicle with a tow hook assembly that reduces damage to parts of the vehicle.

SUMMARY

In one embodiment, a vehicle includes a vehicle frame, a front bumper, and a tow hook assembly. The vehicle frame has an open interior. The front bumper includes a front surface, a rear surface opposite the front surface, and a channel extending between the front surface and the rear surface. The tow hook assembly includes an attachment cord coupled to the vehicle frame and extends through the channel of the front bumper.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
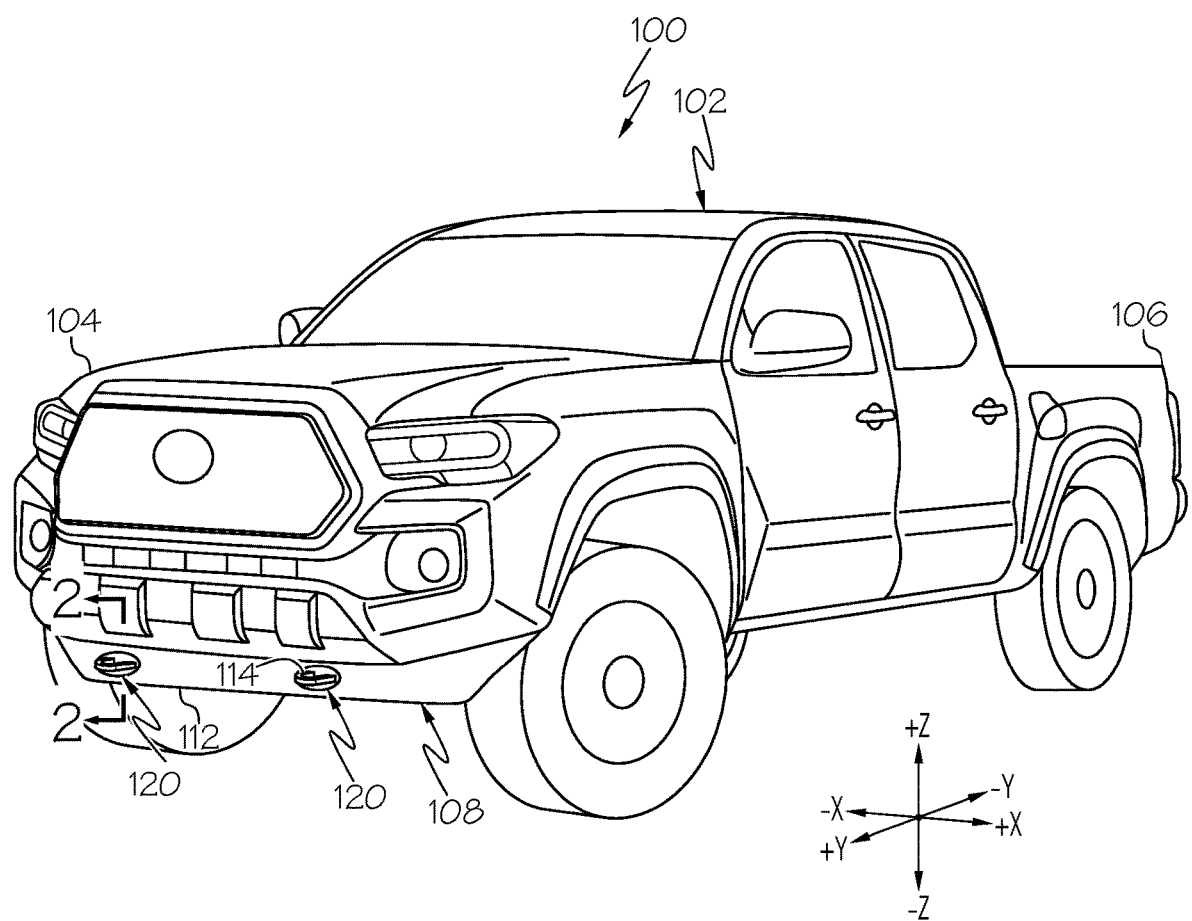
FIG. 1 schematically depicts a perspective view of a vehicle including a pair of tow hook assemblies, according to one or more embodiments shown and described herein.

Embodiments described herein are directed to vehicles including one or more tow hook assemblies including an attachment cord, such that the attachment cord of the tow hook assembly is flexibly movable during a front end collision, while otherwise having the durability to tow a vehicle. The various components of the tow hook assemblies disclosed herein may be positioned such that contact with a pedestrian, as well as damage to other components of the vehicle, is minimized during a front end collision.

The vehicles described herein include a vehicle frame, a front bumper, a crush box, and a tow hook assembly. The vehicle frame defines an open interior. The front bumper has a front surface, a rear surface opposite the front surface, and a channel extending through the front surface and the rear surface. The crush box extends between the vehicle frame and the front bumper and defines an open interior coaxial with the open interior of the vehicle frame and the channel extending through the front bumper. The tow hook assembly includes an attachment cord coupled to the vehicle frame and extending through the open interior of the crush box and the channel of the front bumper. Various embodiments of the vehicle and the operation of the tow hook assembly are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/−Y direction of the coordinate axes depicted in FIG. 1). The term "vehicle lateral direction" refers to the cross-vehicle direction (i.e., in the +/−X direction of the coordinate axes depicted in FIG. 1), and is transverse to the vehicle longitudinal direction. The term "vehicle vertical direction" refers to the upward-downward direction of the vehicle (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings.

Referring to FIG. 1, a vehicle 100 is generally illustrated according to one or more embodiments described herein. As shown, the vehicle 100 is illustrated as a pickup truck. However, the vehicle 100 may be any suitable automobile including coupes, sedans, minivans, crossovers, hybrids, sports utility vehicles, or the like, in addition to other vehicles such as a bus, boat, or the like, without limiting the scope of the present disclosure. The vehicle 100 includes a body 102 having a front end 104, a rear end 106 opposite the front end 104, and a front bumper 108 having a bottom surface 112 provided at the front end 104 of the body 102 of the vehicle 100.

The vehicle 100 includes one or more tow hook assemblies 120 located at the front end 104 of the body 102 of the vehicle 100. For example, as depicted herein, the vehicle 100 includes a pair of tow hook assemblies 120 that extend through a channel 114 formed in the front bumper 108. However, it should be appreciated that the vehicle 100 may include any number of tow hook assemblies 120, such as one tow hook assembly 120 or more than two tow hook assemblies 120. In addition, the tow hook assembly 120 may be mounted at any suitable location of the vehicle 100 such as, for example, at the bottom surface 112 of the front bumper 108, at the front end 104 of the vehicle 100, or to a cross member of the vehicle 100 located in a rearward vehicle longitudinal direction of the front bumper 108 (in the −Y direction of the coordinate axes depicted in FIG. 1).

Figure 2:
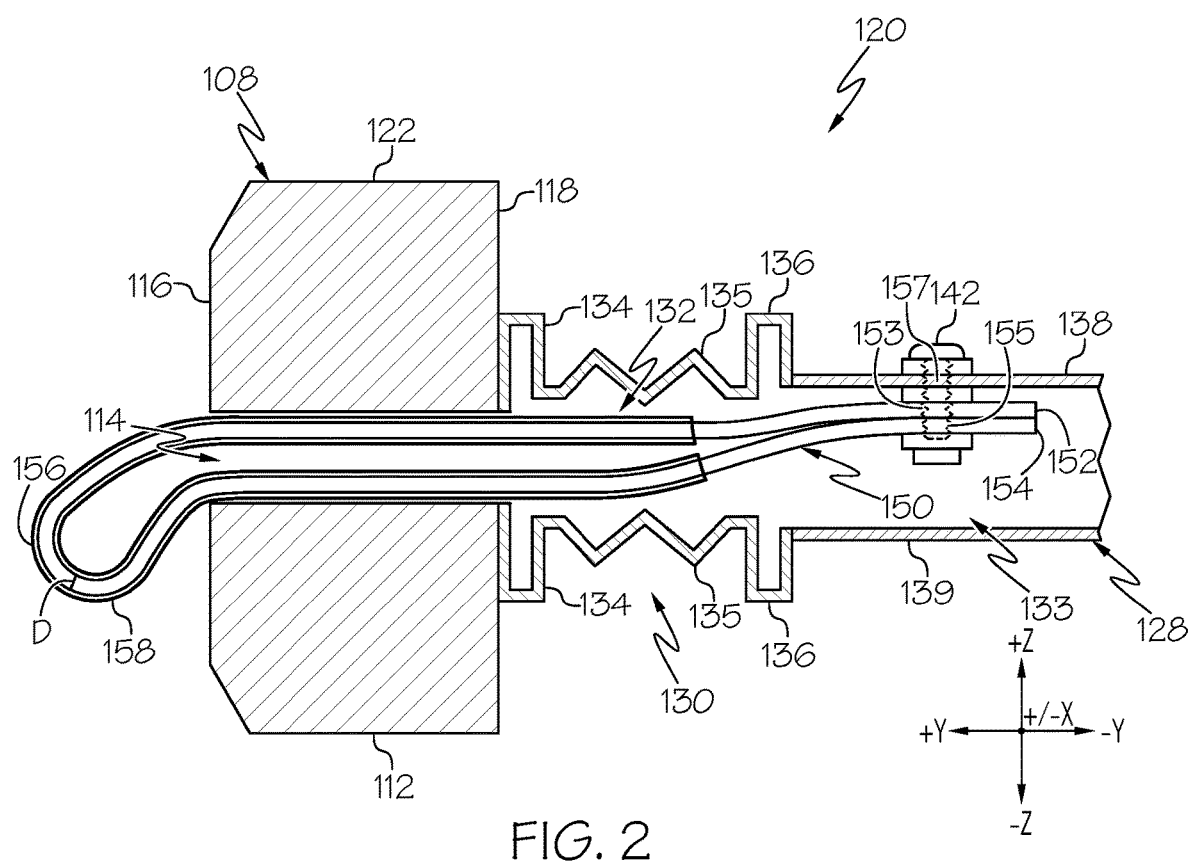
FIG. 2 schematically depicts a cross sectional view of a tow hook assembly taken along line 2-2 of FIG. 1 during a front end collision, according to one or more embodiments shown and described herein.

Referring now to FIG. 2, a cross sectional view of the tow hook assembly 120 taken along line 2-2 of FIG. 1 is depicted. The vehicle 100, depicted with the tow hook assembly 120, includes the front bumper 108, a vehicle frame 128, a crush box 130, and the tow hook assembly 120. The vehicle frame 128 has an open interior 133 defined by a top surface 138 and a lower surface 139. The term "vehicle frame" may refer to any supporting structure of the vehicle 100 to which other components are attached. The front bumper 108 includes a front surface 116, and a rear surface 118 opposite the front surface 116. The front bumper 108 further includes a bottom surface 112 and a top surface 122 opposite the bottom surface 112. A channel 114 is formed in the front bumper 108 and extends through the front bumper 108, parallel to the bottom surface 112 and the top surface 122. The channel 114 extends between the front surface 116 and the rear surface 118 of the front bumper 108.

The crush box 130 extends between the vehicle frame 128 and the front bumper 108 and includes an open interior 132. The crush box 130 includes a first end portion 134, a second end portion 136 opposite the first end portion 134, and a central portion 135 provided between the first end portion 134 and the second end portion 136. The first end portion 134 is coupled to the front bumper 108 and the second end portion 136 is coupled to the vehicle frame 128. The first end portion 134 and the second end portion 136 may be coupled to the front bumper 108 and the vehicle frame 128 in any suitable manner such as, for example, fasteners, welding, and the like. The term "crush box" may refer to an energy absorbing device installed between the vehicle frame 128 and the front bumper 108 to reduce an impact force exhibited during vehicle collisions. The open interior 133 of the vehicle frame 128 is coaxial with the open interior 132 of the crush box 130, which is coaxial with the channel 114 extending through the front bumper 108. In embodiments, the central portion 135 collapses in the vehicle longitudinal direction to reduce an impact force at the front end 104 of the vehicle 100.

Still referring to FIG. 2, the tow hook assembly 120 includes an attachment cord 150 coupled to the vehicle frame 128. More particularly, the attachment cord 150 extends through the open interior 133 of the vehicle frame 128, the open interior 132 of the crush box 130, and through the channel 114 of the front bumper 108. In embodiments, the attachment cord 150 includes a first end 152, a second end 154, and a loop portion 156 provided between the first end 152 and the second end 154. In embodiments, the attachment cord 150 may be formed from a flexible material, for example, a cable, a braided cable, a rope, a chain, or the like. In embodiments, the attachment cord 150 may be formed of metallic material, woven, nonwoven, natural, or synthetic materials. Accordingly, in use, the attachment member 150 is folded onto itself such that the first end 152 is positioned adjacent the second end 154 with the loop portion 156 positioned opposite the first end 152 and the second end 154. The first end 152 and the second end 154 are provided within the open interior 133 of the vehicle frame 128. The loop portion 156 is positioned opposite the first end 152 and the second end 154 and is provided exteriorly to the front surface 116 of the front bumper 108, opposite the crush box 130. In embodiments, the attachment cord 150 has a diameter D equal to or greater than one-eighth inches and less than or equal to three inches.

In embodiments, the tow hook assembly 120 may further include a sheathing 158 surrounding a portion of the attachment cord 150. In embodiments, the sheathing 158 may surround the loop portion 156 of the attachment cord 150 and extend along the attachment cord 150 through the channel 114 of the front bumper 108. In embodiments, the sheathing 158 may further extend along the attachment cord 150 through the open interior 132 of the crush box 130. In embodiments, the sheathing 158 may further extend along the attachment cord 150 through the open interior 133 of the vehicle frame 128. The sheathing 158 improves a strength and durability of the attachment cord 150 while maintaining flexibility. It should be appreciated that the sheathing 158 may be of any material that may adequately surround the attachment cord 150 and remain flexible, for example, carbon fiber, plastic coating, rubber or the like.

In embodiments, a cross-sectional shape of the attachment cord 150 with or without the sheathing 158 is dimensioned to be less than the cross-sectional shape of the channel 114. Specifically, the cross-sectional shape and size of the attachment cord 150 corresponds to the cross-sectional shape and size of the channel 114 such that the loop portion 156 of the attachment cord 150 is inhibited from entering into the channel 114. Accordingly, the cross-sectional shape and size of the channel 114 inhibits the loop portion 156 of the attachment cord 150 from retreating into the channel 114.

The attachment cord 150 may be coupled to the vehicle frame 128 in any suitable manner such as, for example, welding, using a fastener, adhesive, or the like. In some embodiments, the attachment cord 150 may be fixed to the crush box 130. Particularly, the attachment cord 150 may extend through, the open interior 132 of the crush box 130, and through the channel 114 of the front bumper 108. Still referring to FIG. 2, in some embodiments, an aperture 153 is formed at the first end 152 and an aperture 155 is formed at the second end 154 of the attachment cord 150. In embodiments, an aperture 157 is also formed in the top surface 138 vehicle frame 128 and coaxial with the apertures 153, 155 when the first end 152 and the second end 154 are positioned within the open interior 133 of the vehicle frame 128. The tow hook assembly 120 further includes a fastener 142 that extends through the vehicle frame 128 and the apertures 153, 155 formed in the first end 152 and the second end 154 of the attachment cord 150 to secure the attachment cord 150 to the vehicle frame 128. It should be understood that the fastener 142 may secure the attachment cord 150 to any location on the vehicle frame 128 wherein the attachment cord 150 may then extend through the open interior 132 of the crush box 130 and the channel 114 of the front bumper 108.

Figure 3:
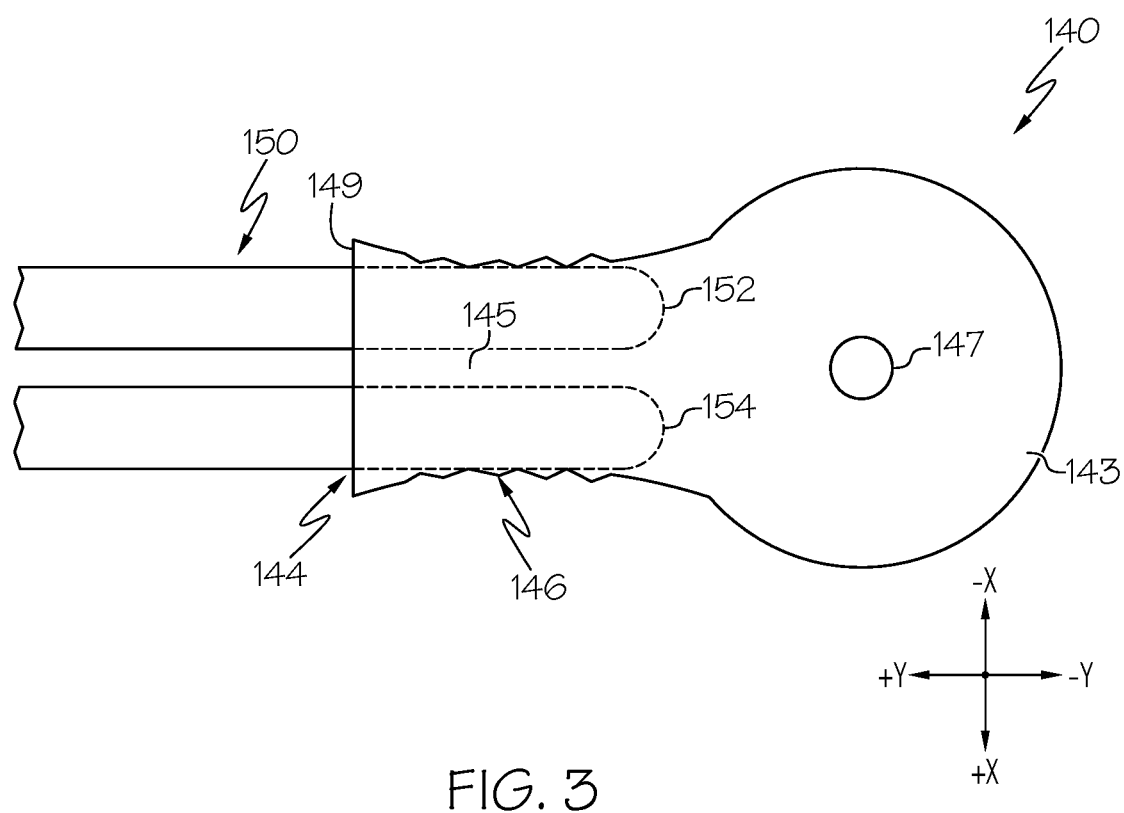
FIG. 3 schematically depicts a partial top view of the tow hook assembly of FIG. 2, according to one or more embodiments shown and described herein.

Referring now to FIG. 3, in other embodiments, the tow hook assembly 120 may further include a coupling member 140 that secures the first end 152 and the second end 154 of the attachment cord 150 to the vehicle frame 128. However, it should be understood that the attachment cord 150 may be coupled to the vehicle frame 128 by welds, clamps, brackets, or the like.

As shown in FIG. 3, an isolated top view of the coupling member 140 is depicted. In some embodiments, the coupling member 140 facilitates coupling the attachment cord 150 to the vehicle frame 128 (FIG. 2) of the vehicle 100 without providing the apertures 153, 155 through each of the first end 152 and the second end 154 of the attachment cord 150. The coupling member 140 includes a receiving portion 145 and a connection portion 143 extending from the receiving portion 145. The connection portion 143 defines an eyelet 147 where a fastener, such as the fastener 142 (FIG. 2), may extend therethrough to fix the connection portion 143 to the vehicle frame 128. The receiving portion 145 has an open end 149 and defines an open interior 144. The first end 152 and the second end 154 of the attachment cord 150 extend through the open end 149 and are positioned within the open interior 144 of the receiving portion 145 of the coupling member 140.

In embodiments, the first end 152 and the second end 154 of the attachment cord 150 extend through the open interior 144 and are fixed within the open interior 144 by a compressed portion 146 of the receiving portion 145. The first end 152 and the second end 154 are clamped down upon with the compressed portion 146 of the receiving portion 145 of the coupling member 140. As referred to herein, the compressed portion 146 refers to a portion of the receiving portion 145 that is deformed by a compression force to have a diameter less than a diameter of the open end 149 of the receiving portion 145. Accordingly, the compressed portion 146 of the receiving portion 145 is compressed against, and secures the first end 152 and the second end 154 of the attachment cord 150 to the coupling member 140. However, it may be understood that the first end 152 and the second end 154 of the attachment cord 150 may be coupled to the coupling member 140 though welds, clamps, brackets, fasteners, or the like.

Referring again to FIGS. 1 and 2, upon a force exceeding a threshold being applied against the front end 104 of the vehicle 100 in a front end collision, the central portion 135 of the crush box 130 crushes and allows for the front bumper 108 and the vehicle frame 128 to "crush" together in a predictable manor. The predictability of movement of vehicle 100 components allows for better protection of other components of the vehicle 100 such damage to the vehicle frame 128. In embodiments, upon the front end collision to the vehicle 100, the attachment cord 150 may compress, fold, or otherwise collapse so as to not interfere with the crushing of the front bumper 108, the crush box 130, and the vehicle frame 128. In addition, during such a front end collision, the portion of the attachment cord 150 extending exteriorly of the front bumper 108 folds or retracts within the front bumper 108 to reduce a length that the attachment cord 150 extends from the front bumper 108.

In use, a hook is attached to the loop portion 156 of the attachment cord 150 and a force is applied in a tow direction parallel to the vehicle longitudinal direction (i.e. +Y direction in FIG. 2). The application of force by the hook in the tow direction places the attachment cord 150 in tension so that the vehicle 100 may be towed.

From the above, it is to be appreciated that defined herein is a vehicle with a tow hook including a flexible attachment cord with the ability to move upon an impact force against a barrier such as, for example, a pedestrian or other object, while maintaining the strength to tow a vehicle. The various components of the tow hook assemblies disclosed herein may be positioned such that contact with a pedestrian, as well as damage to other components of the vehicle, is minimized during a front end collision.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a vehicle frame having an open interior;
a front bumper having a front surface, a rear surface opposite the front surface, and a channel extending between the front surface and the rear surface; and
a tow hook assembly comprising an attachment cord coupled to the vehicle frame, the attachment cord including a first end, a second end opposite the first end, and a loop portion extending between the first end and the second end, the first end and the second end provided within the open interior of the vehicle frame and the loop portion extending through the channel of the front bumper.

2. The vehicle of claim 1, further comprising a crush box extending between the vehicle frame and the front bumper, the crush box having an open interior coaxial with the open interior of the vehicle frame and the channel extending through the front bumper.

3. The vehicle of claim 2, wherein the loop portion is provided exteriorly of the front bumper opposite the crush box.

4. The vehicle of claim 3, wherein the tow hook assembly further comprises a sheathing surrounding a portion of the attachment cord extending through the channel of the front bumper.

5. The vehicle of claim 4, wherein the sheathing surrounds the loop portion of the attachment cord.

6. The vehicle of claim 4, wherein the sheathing comprises a plastic coating.

7. The vehicle of claim 3, wherein the attachment cord is formed from a flexible material selected from the group consisting of a metal braided cable, a synthetic rope, and a chain.

8. The vehicle of claim 3, wherein the tow hook assembly further comprises a fastener extending through an apertures formed in the attachment cord at the first end and the second end and further extends through the vehicle frame to secure the attachment cord to the vehicle frame.

9. The vehicle of claim 3, wherein the tow hook assembly further comprises a coupling member securing the first end and the second end of the attachment cord to the vehicle frame.

10. The vehicle of claim 9, wherein the coupling member comprises a receiving portion and a connection portion, the connection portion including an eyelet, extending from the receiving portion, the first end and the second end of the attachment cord secured within the receiving portion, a fastener extending through the eyelet and the vehicle frame to secure the coupling member to the vehicle frame.

11. The vehicle of claim 10, wherein the receiving portion of the coupling member includes a compressed portion securing the first end and the second end within the receiving portion.

12. A vehicle comprising:
a vehicle frame having an open interior;
a front bumper having a front surface, a rear surface opposite the front surface, and a channel extending between the front surface and the rear surface;
a crush box extending between the vehicle frame and the front bumper, the crush box having an open interior coaxial with the open interior of the vehicle frame and the channel extending through the front bumper; and
a tow hook assembly comprising:
an attachment cord coupled to the vehicle frame and extending through the channel of the front bumper, the attachment cord including a first end, a second end opposite the first end, and a loop portion, the first end and the second end provided within the open interior of the vehicle frame, the loop portion provided exteriorly of the front bumper opposite the crush box; and a sheathing surrounding a portion of the attachment cord extending through the channel of the front bumper.

13. The vehicle of claim 12, wherein the sheathing surrounds the loop portion of the attachment cord.

14. The vehicle of claim 12, wherein the sheathing comprises a plastic coating.

15. The vehicle of claim 12, wherein the tow hook assembly further comprises a fastener extending through an apertures formed in the attachment cord at the first end and the second end and further extends through the vehicle frame to secure the attachment cord to the vehicle frame.

16. The vehicle of claim 12, wherein the tow hook assembly further comprises a coupling member securing the first end and the second end of the attachment cord to the vehicle frame.

17. A vehicle comprising:

a vehicle frame having an open interior;

a front bumper having a front surface, a rear surface opposite the front surface, and a channel extending between the front surface and the rear surface;

a crush box extending between the vehicle frame and the front bumper, the crush box having an open interior coaxial with the open interior of the vehicle frame and the channel extending through the front bumper; and a tow hook assembly comprising an attachment cord coupled to the vehicle frame and extending through the channel of the front bumper, the attachment cord including a first end, a second end opposite the first end, and a loop portion, the first end and the second end provided within the open interior of the vehicle frame, the loop portion provided exteriorly of the front bumper opposite the crush box, the attachment cord formed from a flexible material selected from the group consisting of a metal braided cable, a synthetic rope, and a chain.

18. The vehicle of claim 17, wherein the tow hook assembly further comprises a fastener extending through an apertures formed in the attachment cord at the first end and the second end and further extends through the vehicle frame to secure the attachment cord to the vehicle frame.

19. The vehicle of claim 17, wherein the tow hook assembly further comprises a coupling member securing the first end and the second end of the attachment cord to the vehicle frame.

20. The vehicle of claim 19, wherein the coupling member comprises a receiving portion and a connection portion, the connection portion including an eyelet, extending from the receiving portion, the first end and the second end of the attachment cord secured within the receiving portion, a fastener extending through the eyelet and the vehicle frame to secure the coupling member to the vehicle frame.

* * * * *